(12) United States Patent
Takahira

(10) Patent No.: US 9,470,544 B2
(45) Date of Patent: Oct. 18, 2016

(54) VEHICLE NAVIGATION APPARATUS

(71) Applicant: DENSO CORPORATION, Kariya, Aichi-pref. (JP)

(72) Inventor: Atsushi Takahira, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/763,197

(22) PCT Filed: Feb. 4, 2014

(86) PCT No.: PCT/JP2014/000563
§ 371 (c)(1),
(2) Date: Jul. 24, 2015

(87) PCT Pub. No.: WO2014/122917
PCT Pub. Date: Aug. 14, 2014

(65) Prior Publication Data
US 2015/0369625 A1    Dec. 24, 2015

(30) Foreign Application Priority Data

Feb. 8, 2013    (JP) .................................. 2013-23543

(51) Int. Cl.
*G01C 21/36* (2006.01)
*B60R 16/03* (2006.01)
(Continued)

(52) U.S. Cl.
CPC ........... *G01C 21/3667* (2013.01); *B60R 16/03* (2013.01); *G01C 21/28* (2013.01); *G01C 25/005* (2013.01)

(58) Field of Classification Search
CPC ............................ G01C 21/3667; B60R 16/03

USPC .......................................................... 701/431
See application file for complete search history.

(56) References Cited

U.S. PATENT DOCUMENTS

2008/0234935 A1    9/2008 Wolf et al.
2014/0116133 A1    5/2014 Sheynblat et al.

FOREIGN PATENT DOCUMENTS

JP       H04-295714 A     10/1992
JP          3218876 B2      8/2001
(Continued)

OTHER PUBLICATIONS

Machine Translation JP 2004-61174 puiblished Feb. 2004.*
(Continued)

*Primary Examiner* — Anne Antonucci
*Assistant Examiner* — Anne Mazzara
(74) *Attorney, Agent, or Firm* — Posz Law Group, PLC

(57) ABSTRACT

A vehicle navigation apparatus wherein a detection unit comprising a gyro sensor operates by receiving a power supply from an onboard device. The onboard device comprises: a first control circuit which functions as a navigation apparatus; and a second control circuit which activates in a shorter time period (ΔT3) than the first control circuit, and starts the power supply to the detection unit, and collection of vehicle information. The detection unit comprises a zero point correction unit which samples the gyro voltage for a prescribed interval (ΔT0) after the power supply is started by the second control circuit. On the basis of the vehicle information which is transmitted after the activation of the first control circuit, the zero point correction unit determines whether the vehicle was stopped during the sampling interval, and sets a zero point for the gyro sensor on the basis of the gyro voltage sampling result

5 Claims, 6 Drawing Sheets

(51) Int. Cl.
*G01C 21/28* (2006.01)
*G01C 25/00* (2006.01)

(56) References Cited

FOREIGN PATENT DOCUMENTS

| | | |
|---|---|---|
| JP | 2001-242965 A | 9/2001 |
| JP | 2004-061174 A | 2/2004 |
| JP | 2004-219228 A | 8/2004 |
| JP | 3628046 B2 | 12/2004 |
| JP | 2006-071473 A | 3/2006 |
| JP | 2011-070261 A | 4/2011 |
| JP | 2012-137455 A | 7/2012 |

OTHER PUBLICATIONS

Machine Translation JP 2006-71473 published Mar. 2006.*
International Search Report and Written Opinion of the International Searching Authority dated Mar. 11, 2014 issued in the corresponding International application No. PCT/JP2014/000563 (and English translation).

* cited by examiner

VEHICLE NAVIGATION APPARATUS

CROSS REFERENCE TO RELATED APPLICATIONS

This application is a U.S. national stage application of International Patent Application No. PCT/JP2014/000563 filed on Feb. 4, 2014 and is based on Japanese Patent Applications No. 2013-23543 filed on Feb. 8, 2013, the disclosures of which are incorporated herein by reference.

TECHNICAL FIELD

The present disclosure relates to a vehicle navigation apparatus that includes an in-vehicle unit as a navigation apparatus body and that is separated from a position detection unit including a gyro sensor.

BACKGROUND

A vehicle navigation apparatus detects a current position and a travel direction of a vehicle, causes a display apparatus to display a vehicle mark corresponding to a detection result along with a road map, and thereby provides a driver with the vehicle travel guidance.

As described in patent literatures 1 and 2, a known vehicle navigation apparatus includes a gyro sensor and detects a vehicle position and a travel direction according to known dead-reckoning navigation based on an angular velocity detected by the gyro sensor and a detection signal from a vehicle speed sensor or an acceleration sensor (vehicle speed or acceleration).

Characteristics of an angular velocity detected by the gyro sensor vary with an ambient environment such as temperature.

For this reason, a vehicle navigation apparatus including a gyro sensor generally performs zero point correction, namely, setting a zero point for gyro sensor output when the vehicle navigation apparatus starts up by powered on or the traveling vehicle stops (e.g., see patent literature 3).

A reason for performing the zero point correction at a time of startup of the vehicle navigation apparatus or a time of a stop state of the vehicle is that no angular velocity is applied to the gyro sensor (i.e., angular velocity=0) in this case.

PATENT LITERATURES

Patent Literature 1: JP-3218876B
Patent Literature 2: JP-3628046B
Patent Literature 3: JP-2012-137455 A With regard to a vehicle navigation apparatus, the inventor of the present application found the following. The gyro sensor takes time to stabilize an output after the power is turned on. At startup, the vehicle navigation apparatus performs the zero point correction after an output from the gyro sensor stabilizes.

The zero point correction for a gyro sensor samples an output from the gyro sensor for a specified period and computes a zero point based on the sampling result. The purpose is to accurately set a zero point free from an effect such as noise.

After the gyro sensor is turned on, completing the zero point correction requires specified time $\Delta T0$ (see FIG. 7) that is a sum of the time to start the gyro sensor itself until an output from the gyro sensor stabilizes and the time to perform the zero point correction.

It is recently conceived that a detection unit for position detection including the gyro sensor is provided separately from an in-vehicle unit serving as the vehicle navigation apparatus body in order to simplify a configuration of the vehicle navigation apparatus as a whole using the navigation function of a smartphone or the like.

This kind of a vehicle navigation apparatus including the detection unit and the in-vehicle unit separated from each other is a vehicle navigation apparatus of a detection unit separated type. In this type, the in-vehicle unit supplies the power to the detection unit. After the in-vehicle unit is turned on, the detection unit requires a longer time to complete the zero point correction than specified time $\Delta T0$.

As illustrated in FIG. 7, the in-vehicle unit in the vehicle navigation apparatus is turned on at time t0. A control circuit (generally a microcomputer) of the in-vehicle unit starts up first. Then, the power supply to the detection unit starts under control of the control circuit.

After the in-vehicle unit is turned on, the power supply to the detection unit (consequently the gyro sensor) does not start at least until time point t1 when time $\Delta T1$ to start the control circuit has elapsed.

After the in-vehicle unit is turned on (time point t0), the vehicle navigation apparatus of a detection unit separated type necessitates the detection unit consuming the time until time point t2 to complete the zero point correction on the gyro sensor. The time until time point t2 is longer than or equal to $\Delta T0+\Delta T1$, namely, the sum of specified time $\Delta T0$ and time $\Delta T1$ to start the control circuit.

The vehicle navigation apparatus is normally supplied with the power from a battery mounted on the vehicle and operates when a driver turns on an accessory switch or an ignition switch of the vehicle.

The vehicle navigation apparatus separately including the detection unit requires a long time after the driver's manipulation on the accessory switch or the ignition switch until completion of the zero point correction on the gyro sensor. During this time, the driver may inadvertently start driving manipulation to drive the vehicle.

If the driver drives the vehicle during the zero point correction, an angular velocity is applied to the gyro sensor to prevent the zero point correction from being performed normally.

The zero point correction on the gyro sensor is designed to stop when the vehicle is driven. However, when the zero point correction to be performed at the startup of the vehicle navigation apparatus stops, accurate detection of an angular velocity (consequently a vehicle position and a travel direction) using the gyro sensor cannot be performed until the vehicle stops next and the zero point correction is completed.

SUMMARY

The present disclosure is made in consideration of the foregoing and is directed to a vehicle navigation apparatus of a detection unit separated type. It is an object of the present disclosure to shorten a time period to enable a zero point correction after startup of the vehicle navigation apparatus and to prevent zero point correction on a gyro sensor from being stopped due to a driver's operation to drive a vehicle.

A vehicle navigation apparatus according to an example of the present disclosure includes an in-vehicle unit and a detection unit. The in-vehicle unit displays a road map containing a vehicle position on a display portion to provide travel guidance for a vehicle. The detection unit operates by being supplied with power from the in-vehicle unit, and detects a current position and a travel direction of the vehicle and outputs the current position and the travel direction to the in-vehicle unit.

In the in-vehicle unit, a first control portion communicates with the detection unit to transmit vehicle information to the detection unit and to acquire the current position and the travel direction from the detection unit, and provides the travel guidance.

The in-vehicle unit includes a second control portion that, in response to start of power supply the in-vehicle unit (in response to power on) starts up in a shorter time than the first control portion and starts supplying the power to the detection unit and collecting the vehicle information.

When the first control portion starts up later than the second control portion in response to the power on, the first control portion transmits the vehicle information to the detection unit. This vehicle information is collected by the second control portion during a period associated with the later startup of the first control portion.

The detection unit includes a gyro sensor and a zero point correction portion. The gyro sensor detects an angular velocity applied to the vehicle. The zero point correction portion sets a zero point of output of the gyro sensor.

When the detection unit starts up in response to the power supply from the in-vehicle unit, the zero point correction portion samples the output of the gyro sensor. The zero point correction portion determines whether or not the vehicle is in a stop state during sampling of the output of the gyro sensor based on the vehicle information transmitted from the first control portion.

When determining that the vehicle is in the stop state during the sampling, the zero point correction portion sets the zero point of the output of the gyro sensor based on a sampling result.

According to the above-described vehicle navigation apparatus, the second control portion starts supplying the power to the detection unit in response to the power on of the in-vehicle unit so that the detection unit starts up and samples the output of the gyro sensor until the first control portion starts up.

The output of the gyro sensor used to perform the zero point correction immediately after the startup of the vehicle navigation apparatus is sampled in a short time after the power on of the in-vehicle unit. This can decrease a probability for a driver to drive the vehicle during the sampling period.

Therefore, the vehicle navigation apparatus according to the present disclosure can decrease a probability that the vehicle is determined as being moving during the sampling of the output of the gyro sensor based on vehicle information transmitted from the in-vehicle unit and the zero point correction portion stops the zero point correction.

The vehicle navigation apparatus according to the present disclosure can increase a probability of performing the zero point correction on the gyro sensor immediately after startup of the apparatus and allow the detection unit to accurately detect a vehicle position and a travel direction.

BRIEF DESCRIPTION OF DRAWINGS

The above and other objects, features, and advantages of the present disclosure will be more apparent from the following detailed description with reference to the accompanying drawings in which.

DETAILED DESCRIPTION

An embodiment of the present disclosure will be described with reference to the accompanying drawings.

Figure 1:
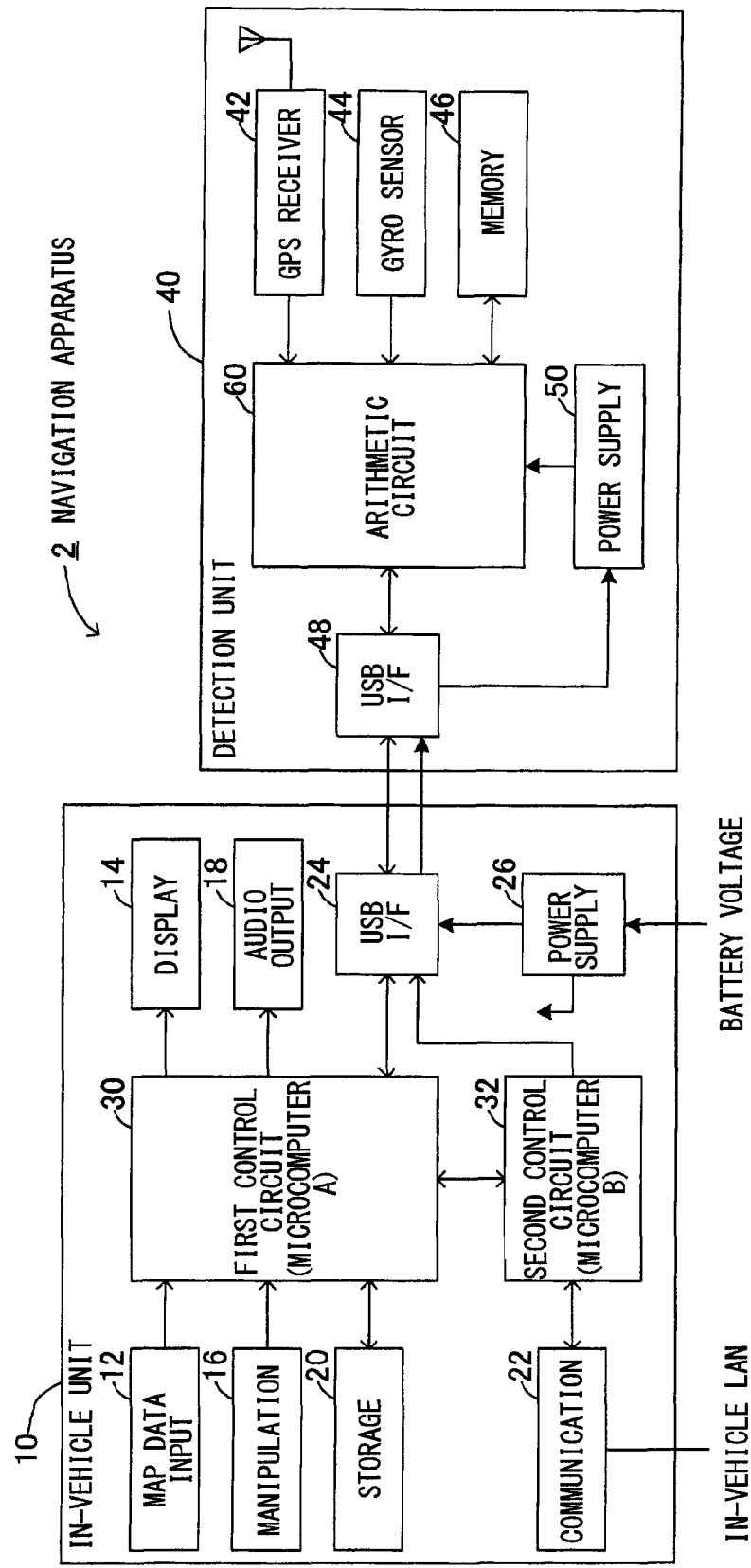
FIG. 1 is a block diagram illustrating an overall configuration of a navigation apparatus according to an embodiment.

As illustrated in FIG. 1, a vehicle navigation apparatus (hereinafter referred to simply as a navigation apparatus) 2 according to the embodiment includes an in-vehicle unit 10 as a navigation apparatus body. The vehicle navigation apparatus 2 further includes a detection unit 40 to detect a vehicle position or a travel direction.

The in-vehicle unit 10 includes a map data input portion 12, a display portion 14, a manipulation portion 16, an audio output portion 18, a storage portion 20, a communication portion 22, a USB I/F (I/F denotes an interface) 24, a power supply portion 26, a first control circuit 30, and a second control circuit 32.

The map data input portion 12 inputs map data such as map matching data, map drawing data, and route search data to improve position detection accuracy.

Generally, a database of map data is stored in a read-only storage medium such as CD-ROM or DVD-ROM. The database may be stored in a writable storage medium such as memory card or a hard disk (HDD).

The display portion 14 may include a liquid crystal display or an organic EI display.

The display portion 14 provides a display screen as a travel guidance screen for a driver. The screen displays a road map around the vehicle along with a vehicle mark indicating the vehicle position and the travel direction. The road map is generated based on map data input from the map data input portion 12.

The screen of the display portion 14 displays a map for travel guidance and is overlapped with various manipulation switches to control a map scale and to switch between display formats (two-screen display and one-screen display or 3D display and 2D display).

The display portion 14 also displays a menu screen including switches to configure the navigation apparatus 2 on the display screen and to select a function to be performed.

The manipulation portion 16 includes a touch panel integrated with the display portion 14 and a mechanical switch provided around the display portion 14. The manipulation portion 16 is used to scroll a displayed map, enter text or numbers to search for an intended map or facility, or manipulate various switches.

The audio output portion 18 reproduces music or audio for travel guidance and outputs it from a speaker.

The storage portion 20 includes a writable storage medium such as an SD card, HDD, SSD, or Flash-ROM. The storage portion 20 stores software such as an application and an operating system and various types of data.

The communication portion 22 communicates with other in-vehicle units via an in-vehicle LAN such as CAN or UN. The communication portion 22 acquires vehicle information indicating vehicle states such as a vehicle speed.

The USB I/F 24 communicates with the detection unit 40 and supplies the power to the detection unit 40.

The power supply portion 26 is supplied with the power from an in-vehicle battery in response to manipulation of an accessory switch or an ignition switch of the vehicle and generates the power (DC constant voltage) to drive components in the in-vehicle unit 10 and power supply voltage supplied to the detection unit 40.

The first control circuit 30 is configured as a known microcomputer (microcomputer A) including a CPU, ROM, RAM, I/O, and a bus line connecting these components.

The first control circuit 30 connects with the map data input portion 12, the display portion 14, the manipulation portion 16, the audio output portion 18, the storage portion 20, the USB I/F 24, and the second control circuit 32.

The first control circuit 30 is supplied with a power supply voltage from the power supply portion 26 and thereby starts operating under the operating system (OS) stored in the storage portion 20. The first control circuit 30 performs an application (or a program) stored in the storage portion 20 to provide the function as a navigation apparatus.

The first control circuit 30 detects a position using the detection unit 40, displays a map on the display portion 14 based on map data acquired from the map data input portion via the map data input portion 12, displays a vehicle mark on the displayed map, provides audio guidance using the audio output portion 18, and configures various functions based on an instruction from the manipulation portion 16.

The second control circuit 32 is configured as a known microcomputer (microcomputer B) including a CPU, ROM, RAM, I/O, and a bus line connecting these components. The second control circuit 32 connects with the first control circuit 30, the communication portion 22, and the USB I/F 24.

The second control circuit 32 functions as an auxiliary circuit for the first control circuit 30. The second control circuit 32 is supplied with a power supply voltage from the power supply portion 26 and then starts operating in a shorter time than a time to start the first control circuit 30 based on a program stored in the ROM.

After startup, the second control circuit 32 starts collecting vehicle information using the communication portion 22 and supplying the power to the detection unit 40 from the USB I/F 24.

The first control circuit 30 can communicate with the detection unit 40 using the USB I/F 24. The second control circuit 32 lacks this communication function and has only a function to turn on or off the power supply from the USB I/F 24 to the detection unit 40.

This is because the second control circuit 32 uses simply configured and low-cost microcomputer B while the first control circuit 30 uses microcomputer A.

The detection unit 40 includes a GPS receiver 42 to detect a vehicle position based on a radio wave from a satellite, a gyro sensor 44 to detect an angular velocity, memory 46, a USB I/F 48, a power supply portion 50, and an arithmetic circuit 60.

The memory 46 stores vehicle information acquired from the in-vehicle unit 10 and a detection result such as a vehicle position or a travel direction. The memory 46 uses nonvolatile memory capable of rewriting data.

The USB I/F 48 connects with the USB I/F 24 of the in-vehicle unit 10 via a USB cable. The USB I/F 48 thereby receives a power supply voltage supplied from the in-vehicle unit 10 and communicates with the in-vehicle unit 10.

The power supply portion 50 receives a power supply voltage from the USB I/F and generates a power supply voltage (DC constant voltage) to drive components including the arithmetic circuit 60.

The arithmetic circuit 60 is configured as a known microcomputer including a CPU, ROM, RAM, I/O, and a bus line connecting these components and is connected to the other components.

The arithmetic circuit 60 uses the known dead-reckoning navigation to detect a vehicle position and a travel direction based on a signal received from the GPS receiver 42, a detection signal from the gyro sensor 44, and vehicle information (such as a vehicle speed) acquired from the in-vehicle unit 10.

The arithmetic circuit 60 performs the zero point correction when the arithmetic circuit 60 starts up in response to power supply from the power supply portion 50 or the running vehicle stops. The zero point correction samples output from the gyro sensor 44 for a specified period to set a zero point for the gyro sensor 44.

With reference to flowcharts in FIGS. 2 through 5, the following describes processes performed on the first control circuit 30 and the second control circuit 32 in the in-vehicle unit 10 and the arithmetic circuit 60 in the detection unit 40.

Figure 2:
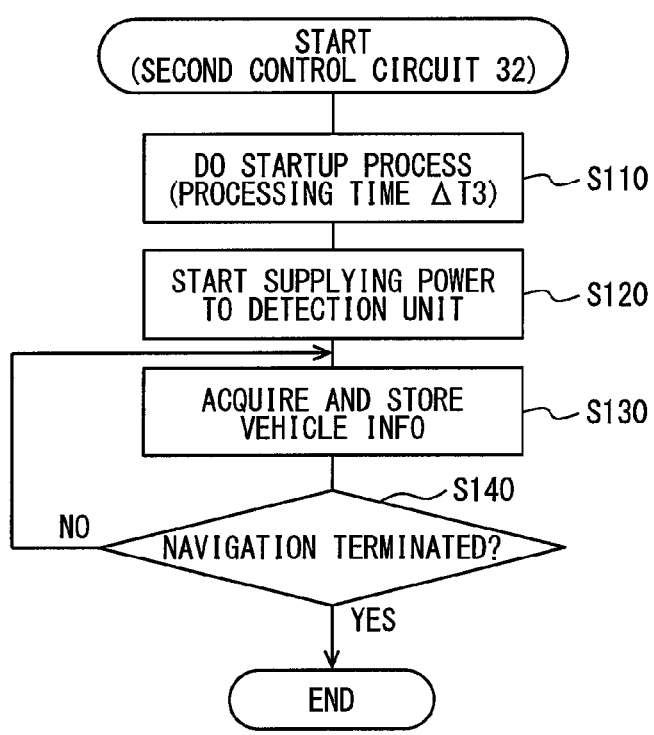
FIG. 2 is a flowchart illustrating a control process performed on a second control circuit of an in-vehicle unit.

As illustrated in FIG. 2, the second control circuit 32 in the in-vehicle unit 10 performs a specified startup process at S110 (S signifies step) when the power supply portion 26 starts supplying the power. At S120, the second control circuit 32 starts the power supply to the detection unit 40 from the USB I/F 24.

Figure 6:
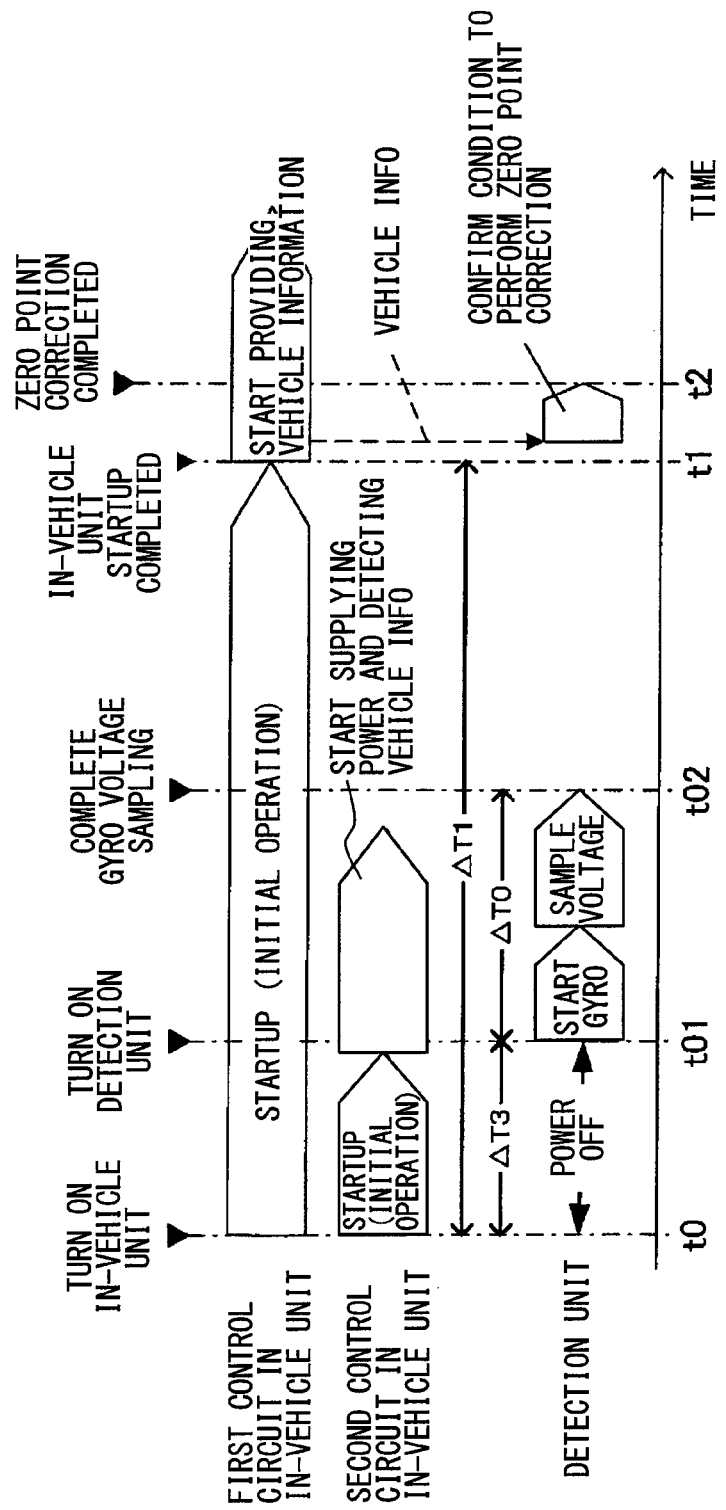
FIG. 6 is a timing diagram illustrating an operation when the navigation apparatus according to the embodiment starts up.

As illustrated in FIG. 6, processing time Δ3 (e.g., approximately one second) for the startup process at S110 is shorter than processing time ΔT1 to start the first control circuit 30.

After the in-vehicle unit 10 is turned on, the second control circuit 32 starts up earlier than the first control circuit 30 and starts supplying the power to the detection unit 40 before the first control circuit 30 starts up.

Having started supplying the power to the detection unit 40, the second control circuit 32 proceeds to S130 and starts a vehicle information acquisition process. This process acquires (or samples) vehicle information via the communication portion 22 and stores the vehicle information in the internal memory (e.g., nonvolatile RAM).

The process at S130 is repeated until the navigation is determined to terminate at S140. If the navigation is determined to terminate at S140, the second control circuit 32 terminates the control process.

At S130, the vehicle information is stored in the internal memory and is supplied with a time stamp (time information) that indicates the information acquisition time. The time stamp may represent the time of day or a lapse of time from the time to start sampling the vehicle information at S130.

The determination at S140 whether or not the navigation terminates is to determine whether or not the first control circuit 30 generates a termination instruction.

Figure 3:
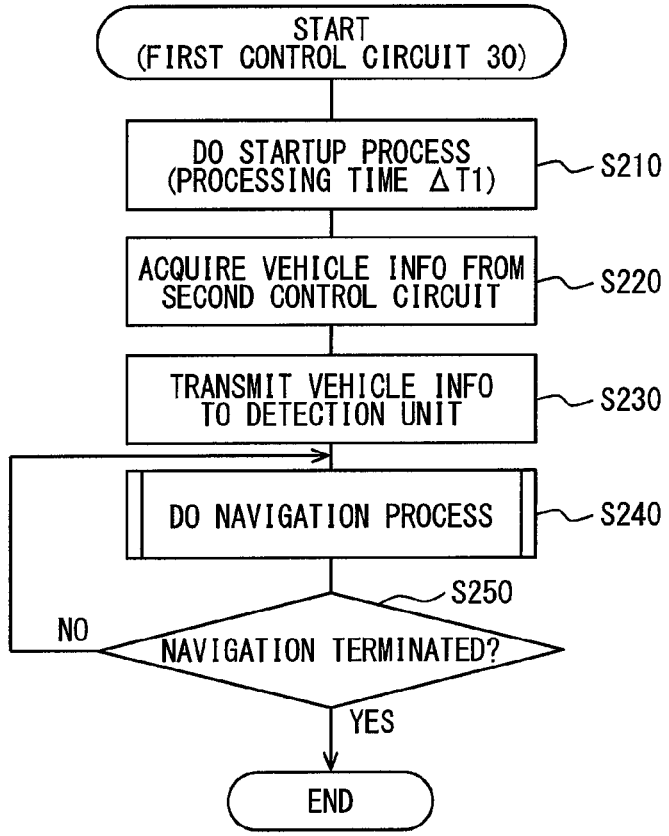
FIG. 3 is a flowchart illustrating a control process performed on a first control circuit of an in-vehicle unit.

When the power supply portion 26 starts supplying the power, the first control circuit 30 in the in-vehicle unit 10 performs a specified startup process at S210 as illustrated in FIG. 3.

The startup process starts the OS and then initializes various parameters. The processing time (e.g., approximately 7 seconds) is longer than time ΔT1 to start the second control circuit 32.

At S220, the first control circuit 30 acquires all vehicle information from the second control circuit 32. The vehicle information is stored in the internal memory after the second control circuit 32 starts. At S230, the first control circuit 30 transmits all the vehicle information acquired at S220 to the detection unit 40 via the USB I/F 24.

At S240, the first control circuit 30 performs a navigation process to implement the function as a navigation apparatus.

The navigation process is repeated until the navigation is determined to terminate at S250.

If the navigation is determined to terminate at S250, the first control circuit 30 transmits a termination instruction to the second control circuit 32 to terminate the control process.

The determination at S250 whether or not the navigation terminates is to determine whether or not a user enters a termination instruction using the manipulation portion 16.

Figure 4:
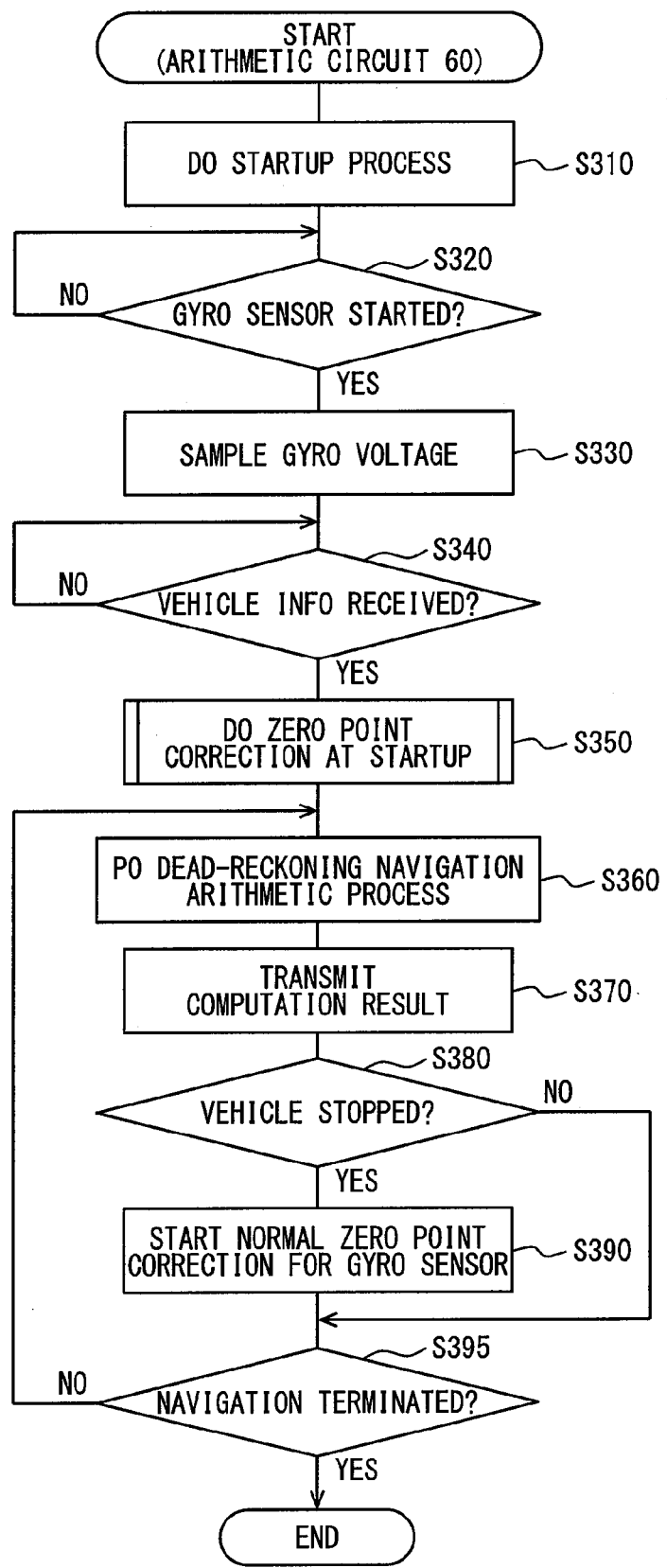
FIG. 4 is a flowchart illustrating an arithmetic process performed on an arithmetic circuit of a detection unit.

When the power supply portion 50 starts supplying the power, the arithmetic circuit 60 in the detection unit 40 performs a specified startup process (or an initialization process) at S310 as illustrated in FIG. 4 and then proceeds to S320.

At S320, the arithmetic circuit 60 determines whether or not a specified time required to stabilize an output from the gyro sensor 44 elapses after the startup process begins at S310. The arithmetic circuit 60 thereby waits until the gyro sensor 44 becomes active to be able to detect an angular velocity.

When the gyro sensor 44 becomes active, the arithmetic circuit 60 proceeds to S330, samples an output (hereinafter also referred to as a gyro voltage) from the gyro sensor 44 for a specified period, and stores the sampled gyro voltages in the memory 46.

At S340, the arithmetic circuit 60 determines whether or not the USB I/F 48 receives vehicle information from the first control circuit 30 in the in-vehicle unit 10. The vehicle information is transmitted immediately after the startup of the first control circuit 30. The arithmetic circuit 60 thereby waits until the vehicle information is received.

If determining that the vehicle information is received at S340, the arithmetic circuit 60 proceeds to S350 and performs a zero point correction process at the startup of the gyro sensor 44. The arithmetic circuit 60 thereby initializes the zero point for output from the gyro sensor 44.

This startup zero point correction process at S350 may be a major part of the present disclosure and will be described in more detail later.

At S360, the arithmetic circuit 60 performs a dead-reckoning navigation arithmetic process that computes a vehicle position and a travel direction based on a signal received from the GPS receiver 42, a detection signal from the gyro sensor 44, and vehicle information (such as a vehicle speed) acquired from the in-vehicle unit 10.

At S360, the arithmetic circuit 60 receives a detection signal (or a gyro voltage) from the gyro sensor 44 by correcting output from the gyro sensor 44 based on the most recent zero point set by the startup zero point correction process at S350 or a normal zero point correction process to be described later.

At S370, the arithmetic circuit 60 transmits the computation result (vehicle position and travel direction) to the in-vehicle unit 10 via the USB I/F 48.

At S380, the arithmetic circuit 60 determines whether or not the running vehicle stops. If the vehicle stops, the arithmetic circuit 60 proceeds to S390 to start the normal zero point correction process for the gyro sensor 44 and then proceeds to S395. If the vehicle does not stop (or is traveling), the arithmetic circuit 60 directly proceeds to S395.

At S395, the arithmetic circuit 60 determines whether or not the in-vehicle unit 10 transmits an instruction to terminate the navigation. If no termination instruction is transmitted, the arithmetic circuit 60 returns to S360 and computes a vehicle position and a travel direction and transmits a computation result to the in-vehicle unit 10.

The arithmetic circuit 60 terminates the arithmetic process if determining at S395 that the in-vehicle unit 10 transmits an instruction to terminate the navigation.

The normal zero point correction process activated at S390 samples a gyro voltage for a specified period similarly to S330. The normal zero point correction process resets the zero point for output from the gyro sensor 44 based on the sampled gyro voltages.

The normal zero point correction process updates the zero point for the gyro sensor 44 each time the vehicle stops. The normal zero point correction process stops updating the zero point when the vehicle speed exceeds a specified threshold value to cause the vehicle to travel while a gyro voltage is sampled.

Figure 5:
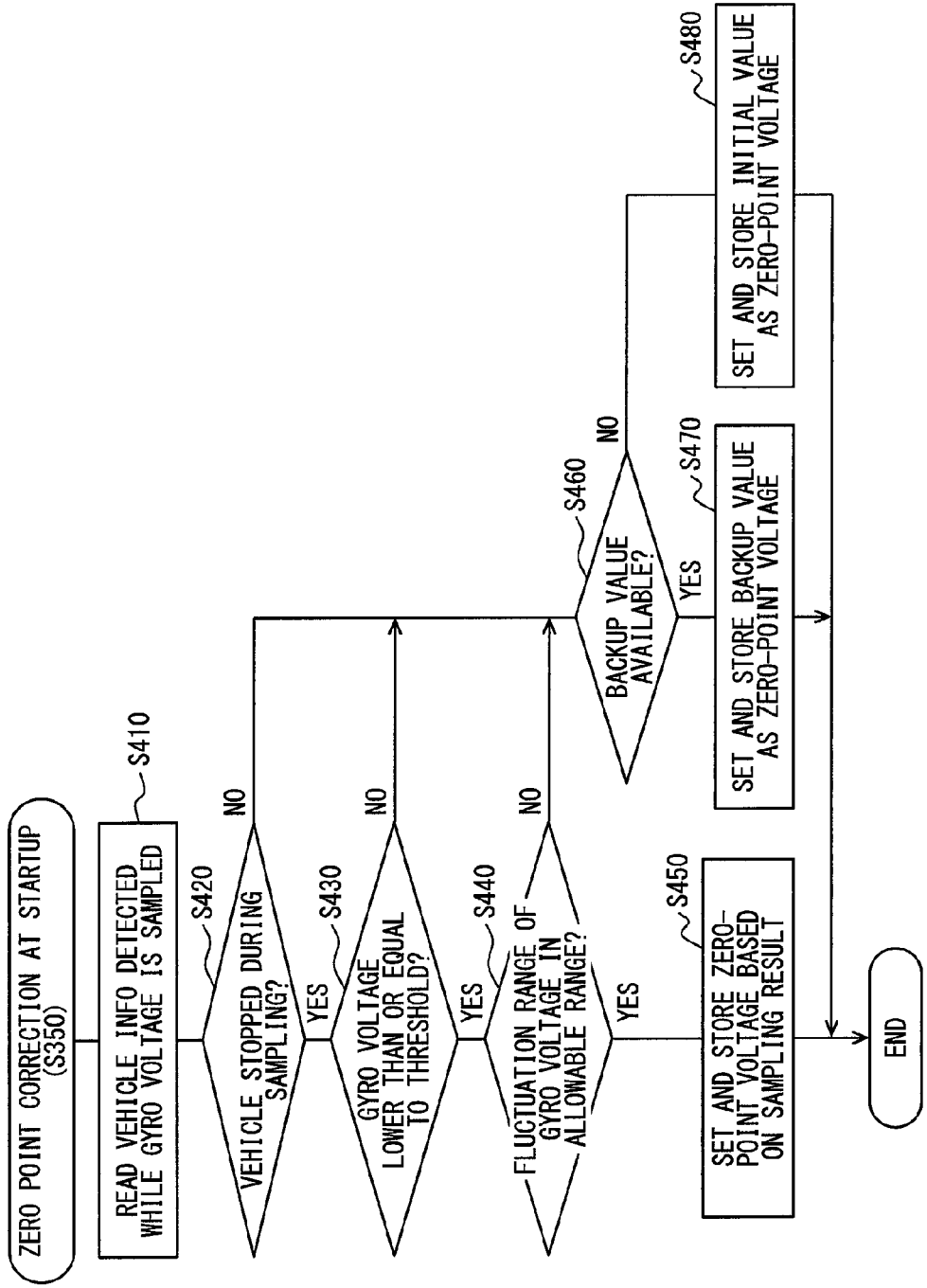
FIG. 5 is a flowchart illustrating a zero point correction process performed at S350 in FIG. 4.

FIG. 5 illustrates the startup zero point correction process performed at S350. At S410, the arithmetic circuit 60 reads the vehicle information acquired while a gyro voltage is sampled at S330. This information is contained in the vehicle information transmitted from the first control circuit 30 in the in-vehicle unit 10 immediately after the startup of the first control circuit 30. This process is performed based on the time stamp attached to the vehicle information.

At S420, the arithmetic circuit 60 determines, based on the vehicle information read at S410, whether or not the vehicle stops while a gyro voltage is sampled at S330.

The vehicle information transmitted from the in-vehicle unit 10 may represent a vehicle speed. In such a case, the arithmetic circuit 60 determines whether or not all vehicle speeds read at S410 are smaller than or equal to a threshold value, and thereby determines whether or not the vehicle stops.

The vehicle information may contain information about a driver's manipulation on the vehicle such as the state of manipulating a parking brake or an accelerator pedal effort. In such a case, the arithmetic circuit 60 may determine, based on the manipulation information, whether or not the vehicle stops.

The arithmetic circuit 60 proceeds to S430 if determining at S420 that the vehicle stops while a gyro voltage is sampled. At S430, the arithmetic circuit 60 determines whether or not all the sampled gyro voltages are smaller than or equal to a threshold value.

The process at S430 determines whether or not the vehicle turns during the sampling period when a sampled gyro voltage exceeds the threshold value. The arithmetic circuit 60 proceeds to S440 if all the sampled gyro voltages are smaller than or equal to the threshold value and the vehicle does not turn.

At S440, the arithmetic circuit 60 determines whether or not a difference between the maximum value and the minimum value of a sampled gyro voltage, namely, a fluctuation range of a gyro voltage, belongs to a specified allowable range. The arithmetic circuit 60 thereby determines whether or not an output from the gyro sensor 44 is stable during the sampling period.

If determining at S440 that the output from the gyro sensor 44 is stable, the arithmetic circuit 60 proceeds to S450 assuming that a condition to perform the zero point correction is satisfied.

At S450, the arithmetic circuit 60 sets a zero-point voltage for output from the gyro sensor 44 based on the gyro voltage sampled at S330. The arithmetic circuit 60 stores the zero-point voltage in the memory 46 and terminates the startup zero point correction process.

The arithmetic circuit 60 proceeds to S460 if determining at S420 that the vehicle travels during the sampling period, if determining at S430 that the vehicle turns during the sampling period, or if determining at S440 that an output from the gyro sensor 44 is unstable during the sampling period.

At S460, the arithmetic circuit 60 determines whether or not operation of the arithmetic circuit 60 set a zero-point voltage for output from the gyro sensor 44 in the past and a backup value remains in the memory 46.

The arithmetic circuit 60 proceeds to S470 if determining at S460 that a backup value for the zero-point voltage is stored. The arithmetic circuit 60 stores the backup value as the most recent zero-point voltage for the gyro sensor 44 in the memory 46 and terminates the startup zero point correction process.

The arithmetic circuit 60 proceeds to S480 if determining at S460 that a backup value for the zero-point voltage is not stored. The arithmetic circuit 60 stores the initial zero-point voltage as the most recent zero-point voltage in the memory 46 and terminates the startup zero point correction process. The initial zero-point voltage is stored in the ROM of the arithmetic circuit 60.

In the navigation apparatus 2 according to the embodiment, the in-vehicle unit 10 includes the second control circuit 32 separately from the first control circuit 30 that implements the function as the navigation apparatus. The second control circuit 32 starts in a shorter time than a time to start the first control circuit 30. After activated, the second control circuit 32 starts supplying the power to the detection unit 40 and collecting the vehicle information.

As illustrated in FIG. 6, immediately after the second control circuit 32 starts (time point t01), the detection unit 40 is supplied with the power and the gyro sensor 44 starts and the arithmetic circuit 60 samples an output (gyro voltage) from the gyro sensor 44.

Figure 7:
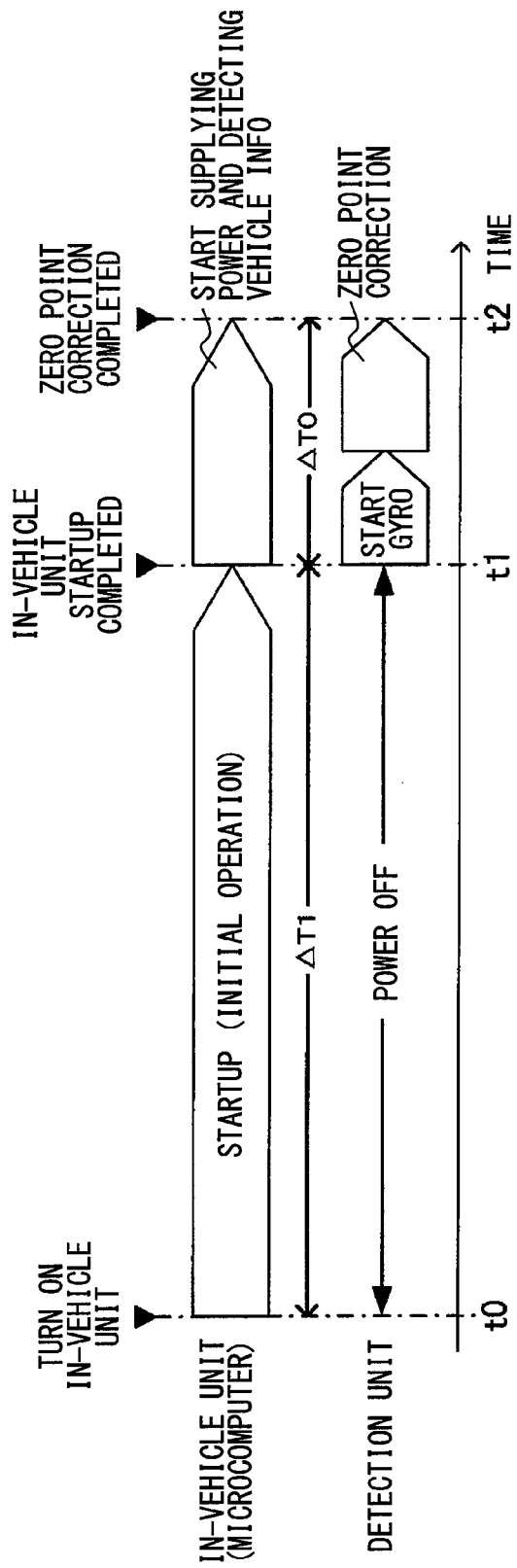
FIG. 7 is a timing diagram illustrating an operation when a navigation apparatus according to a comparative example starts up.

The navigation apparatus 2 according to the embodiment can complete the gyro voltage sampling at startup at the timing (time point t02) earlier than the in-vehicle unit 10 using one control circuit (microcomputer) as illustrated in FIG. 7.

The navigation apparatus 2 according to the embodiment can decrease a probability for a driver to drive the vehicle while a gyro voltage is sampled at startup. Based on the sampling result, the navigation apparatus 2 can increase a probability of performing the zero point correction for output from the gyro sensor.

According to the embodiment, the first control circuit 30 in the in-vehicle unit 10 starts up to transmit all the vehicle information such as a vehicle speed hitherto detected by the second control circuit 32 to the detection unit 40.

In the detection unit 40, the arithmetic circuit 60 performs the startup zero point correction process to determine, based on the vehicle information, whether or not the vehicle stops while a gyro voltage is sampled. If the vehicle does not stop, the arithmetic circuit 60 inhibits the zero point correction based on the sampled gyro voltage.

The navigation apparatus 2 according to the embodiment can prevent the zero point correction from being performed incorrectly if the vehicle travels while a gyro voltage is sampled.

The startup zero point correction process determines whether or not the vehicle stops while a gyro voltage is sampled and also determines whether or not the sampled gyro voltage is smaller than or equal to a threshold value. The startup zero point correction process further determines whether or not a fluctuation range of the gyro voltage belongs to an allowable range.

The arithmetic circuit 60 determines that a condition to perform the zero point correction on the gyro sensor 44 is satisfied if the vehicle stops during the sampling period, the sampling voltage is smaller than or equal to a threshold value, and a fluctuation range of the gyro voltage belongs to an allowable range. The arithmetic circuit 60 sets the zero-point voltage based on a result of sampling the gyro voltage.

The navigation apparatus 2 according to the embodiment can more reliably prevent the zero-point voltage from being set incorrectly.

After startup, the arithmetic circuit 60 acquires the vehicle information from the first control circuit 30 in the in-vehicle unit 10 and determines whether or not a condition to perform the zero point correction is satisfied. The arithmetic circuit 60 thereby sets the zero-point voltage.

Compared to the in-vehicle unit 10 using one control circuit (microcomputer), the navigation apparatus 2 according to the embodiment can shorten the time required to set the zero-point voltage after the in-vehicle unit 10 is completely activated. The navigation apparatus 2 can consequently fast detect a vehicle position using the gyro sensor 44.

The startup zero point correction process may determine that a condition to perform the zero point correction is not satisfied. In such a case, the arithmetic circuit 60 sets the previous backup value or the initial value as the zero-point voltage for the gyro sensor 44.

A condition to perform the zero point correction may not be satisfied immediately after startup. In such a case, the navigation apparatus 2 according to the embodiment can use a backup value or an initial value to correct output from the gyro sensor 44 and detect an angular velocity.

According to the embodiment, the display portion 14 corresponds to a display portion. The first control circuit 30 corresponds to a first control portion. The second control circuit 32 corresponds to a second control portion. The arithmetic circuit 60 corresponds to a zero point correction portion.

The arithmetic circuit 60 performs the process at S330 and S350 (S410 through S480 in detail) to implement the function as the zero point correction portion.

While there has been illustrated an embodiment of the present disclosure, the present disclosure is not limited to this embodiment but is applicable to various embodiments within the spirit and scope of the disclosure.

The startup zero point correction process determines whether or not a condition to perform the zero point correction is satisfied, based on a value of a sampled gyro voltage and its fluctuation range in addition to determination of the stop state based on the vehicle information. The determination of the condition may use only the determination of the stop state based on the vehicle information.

The arithmetic circuit 60 can estimate a period to sample a gyro voltage based on the timing to start up the second control circuit 32.

Immediately after startup, the first control circuit 30 may transmit vehicle information to the detection unit under the condition that the vehicle information is hitherto acquired by the second control circuit 32 and corresponds to the gyro voltage sampling period in the arithmetic circuit 60.

The first control circuit 30 may determine whether or not the vehicle stops during the gyro voltage sampling period, based on the vehicle information acquired by the second control circuit 32. The first control circuit 30 may transmit the determination result as vehicle information.

While there have been illustrated the embodiments and configurations according to the present disclosure, embodiments and configurations according to the disclosure are not limited to the respective embodiments and configurations illustrated above. The scope of embodiments and configurations according to the disclosure also includes part of the embodiment and the configurations, and embodiments and configurations resulting from appropriately combining technical elements disclosed in different embodiments and configurations.

The invention claimed is:

1. A vehicle navigation apparatus comprising:
an in-vehicle unit, the in-vehicle unit includes a first processor and a second processor, the first processor is configured to display a road map containing a vehicle position on a display portion to provide travel guidance for a vehicle; and
a detection unit adapted to operate by being supplied with power from the in-vehicle unit, and detects a current position and a travel direction of the vehicle and outputs the current position and the travel direction to the in-vehicle unit,
wherein the in-vehicle unit includes:
a first control portion, comprises the first processor, the first processor is further configured to: communicate with the detection unit to transmit vehicle information to the detection unit and to acquire the current position and the travel direction from the detection unit and provide the travel guidance; and
a second control portion, comprising the second processor, the second processor is further configured to: in response to start of power supply to the in-vehicle unit, start up in a shorter time than the first control portion, and start supplying the power to the detection unit and collecting the vehicle information,
wherein
when the first control portion starts up later than the second control portion in response to the start of the power supply to the in-vehicle unit, the first control portion is further configured to transmit, during a period associated with the later startup of the first control portion, to the detection unit the vehicle information that is collected by the second control portion;
wherein the detection unit includes:
a gyro sensor that detects an angular velocity applied to the vehicle; and
a third processor, the third processor is configured to set, by a zero point correction portion, a zero point of an output of the gyro sensor,
wherein
when the detection unit starts up in response to the power supply from the in-vehicle unit, the zero point correction portion
samples the output of the gyro sensor,
determines whether or not the vehicle is in a stop state during sampling of the output of the gyro sensor based on the vehicle information transmitted from the first control portion, and
sets the zero point of the output of the gyro sensor based on a sampling result when the vehicle is in the stop state during the sampling.

2. The vehicle navigation apparatus according to claim 1, wherein
when the sampling result of the output of the gyro sensor exceeds a predetermined allowable range, the zero point correction portion inhibits setting of the zero point based on the sampling result.

3. The vehicle navigation apparatus according to claim 1, wherein
immediately after the startup in response to the power supply from the in-vehicle unit, the zero point correction portion samples the output of the gyro sensor a plurality of times and
the zero point correction portion inhibits setting of the zero point based on the sampling results when a fluctuation range of the sampling results obtained from the samplings exceeds an allowable range.

4. The vehicle navigation apparatus according to claim 1, wherein
when the zero point cannot be set based on the sampling result of the output of the gyro sensor, the zero point correction portion sets one of a previously set zero point and a predetermined initial value as the zero point of the output of the gyro sensor.

5. The vehicle navigation apparatus according to claim 1, wherein:
the first control portion and the second control portion are control circuits physically separate from each other, and the first control portion and the second control portion are physically separate from the detection unit;
in response to the start of the power supply to the in-vehicle unit, the second control portion starts up and starts collecting and storing the vehicle information indicating a vehicle speed in a memory of the second control portion;
when the first control portion starts up later than the second control portion in response to the start of the power supply to the in-vehicle unit, the first control portion acquires from the second control portion all the vehicle information stored after the startup of the second control portion and then transmits the acquired vehicle information to the detection unit;
when the detection unit starts up in response to the power supply from the in-vehicle unit and acquires the vehicle information from the first control portion, the zero point correction portion of the detection unit samples the output of the gyro sensor and determines based on the vehicle information transmitted from the first control portion whether or not the vehicle is in the stop state during sampling of the output of the gyro sensor;
when the zero point correction portion determines that the vehicle is in the stop state during sampling of the output of the gyro sensor, the zero point correction portion sets the zero point of the output of the gyro sensor based on the sampling result; and
when the zero point correction portion determines that the vehicle is not in the stop state during sampling of the output of the gyro sensor, the zero point correction portion sets the zero point of the output of the gyro sensor to an initial value or a backup value.

* * * * *